United States Patent
Bandekar et al.

(10) Patent No.: US 9,594,816 B2
(45) Date of Patent: Mar. 14, 2017

(54) SYSTEM AND METHOD TO PROVIDE ANALYTICAL PROCESSING OF DATA IN A DISTRIBUTED DATA STORAGE SYSTEMS

(71) Applicant: Tata Consultancy Services Limited, Mumbai (IN)

(72) Inventors: Bhushan Vidyadhar Bandekar, Mumbai (IN); Sandeep Singh, Mumbai (IN)

(73) Assignee: Tata Consultancy Services Limited (IN)

( * ) Notice: Subject to any disclaimer, the term of this patent is extended or adjusted under 35 U.S.C. 154(b) by 629 days.

(21) Appl. No.: 14/065,248

(22) Filed: Oct. 28, 2013

(65) Prior Publication Data
US 2014/0122412 A1    May 1, 2014

(30) Foreign Application Priority Data
Nov. 1, 2012 (IN) .......................... 3183/MUM/2012

(51) Int. Cl.
*G06F 17/30* (2006.01)
(52) U.S. Cl.
CPC .............................. *G06F 17/30563* (2013.01)
(58) Field of Classification Search
CPC ............ G06F 17/30563; G06F 17/303; G06F 17/2264; G06F 17/30477; G06F 17/30566; G06F 9/5072
USPC ....................................................... 707/602
See application file for complete search history.

(56) References Cited

U.S. PATENT DOCUMENTS

| | | | |
|---|---|---|---|
| 6,604,104 B1 * | 8/2003 | Smith ............... | G06F 17/30563 |
| 8,417,715 B1 * | 4/2013 | Bruckhaus ........ | G06F 17/30994 |
| | | | 705/26.1 |
| 2006/0235714 A1 * | 10/2006 | Adinolfi ................. | G06Q 40/06 |
| | | | 705/1.1 |
| 2012/0221510 A1 | 8/2012 | Li et al. | |

(Continued)

OTHER PUBLICATIONS

Oracle , "Oracle Big Data Connectors User's Guide, Release 1 (1.1)", E36049-03,Copyright © 2011, 2012, Oracle and/or its affiliates.

(Continued)

*Primary Examiner* — Evan Aspinwall
(74) *Attorney, Agent, or Firm* — Finnegan, Henderson, Farabow, Garrett & Dunner, L.L.P.

(57) ABSTRACT

The present disclosure in general relates to technologies for processing data in a distributed data storage system, and more particularly, to a method, a system, and a computer program product for analytical processing of data by using the processing power of the distributed data storage system. In one embodiment, a system for analytical processing of data in a distributed data storage system is disclosed. The system comprises: a data extraction module configured to perform analytical operations to extract data from source databases in one or more data formats; and a processing module configured to perform data refinement operations to categorize the data while the data is being extracted. The processing module comprises: a mapping module configured to perform mapping operations of the categorized data; and a transformation module configured to perform an analytical transforming operation of the mapped categorized data to obtain a transformed categorized data.

18 Claims, 4 Drawing Sheets

(56) References Cited

U.S. PATENT DOCUMENTS

| | | | |
|---|---|---|---|
| 2012/0239612 A1 | 9/2012 | George et al. | |
| 2013/0030827 A1* | 1/2013 | Snyder | G06F 19/345 705/2 |
| 2013/0086116 A1* | 4/2013 | Agarwal | G06F 7/00 707/792 |
| 2013/0144605 A1* | 6/2013 | Brager | G06F 17/3061 704/9 |
| 2013/0332194 A1* | 12/2013 | D'Auria | G06F 19/322 705/3 |

OTHER PUBLICATIONS

Nitesh Maheshwari ,"Efficient Data Placement and Workflow Variability Management in Cloud Computing" Search and Information Extraction Lab, International Institute of Information Technology, Hyderabad—500 032, India, Feb. 2011.

Dale T. Anderson, "Column Oriented Database Technologies" In Big Data, Web & Software Development , DB Best, Technologies, LLC, Jul. 23, 2012.

* cited by examiner

SYSTEM AND METHOD TO PROVIDE ANALYTICAL PROCESSING OF DATA IN A DISTRIBUTED DATA STORAGE SYSTEMS

PRIORITY CLAIM

This U.S. patent application claims priority under 35 U.S.C. §119 to: India Application No. 3183/MUM/2012, filed Nov. 1, 2012. The aforementioned application is incorporated herein by reference in its entirety.

TECHNICAL FIELD

The present disclosure relates generally to technologies for processing data in a distributed data storage system, and more particularly, to a method, a system, and a computer program product for analytical processing of data by using the processing power of the distributed data storage system.

BACKGROUND

In this big data era, ever advancing technologies have started to produce an increasingly large amount of data. To store the large amount of data, which can be useful for doing research and analysis, databases with large capacities are often needed One such type of database includes, but is not limited to, Hadoop, in which mass data may be stored. While storing a large amount of data sometimes may be difficult, managing the large amount of data stored, which can often be in terabytes or more, may be even more difficult. Problems associated with managing large amount data often involve extracting data, transforming the extracted data into a desired format, and storing the transformed data in a desired storage location. Moreover, valuable visualization as per the user's requirement may also be an important factor while storing and using the data from big data storage systems.

Further, handling big data may require using many software tools and/or a large number of servers. Currently, there are many existing extract-transform-load (ETL) tools available in the market to address the issues associate with analyzing big data. However, the existing ETL tools are either quite complex or insufficient to handle big data.

In order to manage and maintain big data, companies in the industry are utilizing distributed data storage systems technologies, such as the Hadoop technology; and are coming up with various ETL tools to support their business requirements. Distributed data storage systems have thus gathered momentum as a mechanism to manage rapidly growing amount of data, from which companies may seek to derive value. Most of the existing ETL operations in a distributed environment are performed using map reduce codes. However, understanding and coding the map reduce code may require immense effort and also may require customized programming to develop, maintain and support. To address this issue, some of the existing technologies provide plug-ins to various big data processing technologies such as Hadoop.

SUMMARY

Before the present methods, are described, it is appreciated that this application is not limited to the particular embodiments of the systems and methodologies described, as there can be multiple possible embodiments which are not expressly illustrated in the present disclosures. It is also appreciated that the terminology used in the present disclosure is for the purpose of describing the particular versions or embodiments only, and is not intended to limit the scope of the present application. This summary is provided to introduce aspects related to methods for analytical processing of data in a distributed data storage system and the aspects are further described below in the detailed description. This summary is not intended to identify essential features of the claimed subject matter nor is it intended for use in determining or limiting the scope of the claimed subject matter.

In one embodiment, a system for analytical processing of data in a distributed data storage system is disclosed. The system comprises a data extraction module configured to perform one or more analytical operations to extract data from one or more source databases in one or more data formats, the one or more source databases having one or more types of constraints and structures; and a processing engine configured to perform one or more data refinement operations to categorize the data while the data is being extracted. The processing engine comprises a mapping module configured to perform one or more types of mapping operations of the categorized data based on one or more mapping rules; and a transformation module configured to perform an analytical transforming operation, based on one or more business rules, of the mapped categorized data to obtain a transformed categorized data, wherein the transformed categorized data is stored in a target area in the distributed data storage system.

In one embodiment, a method for analytical processing of data in a distributed data storage system is disclosed. The method is performed by a processor using programmed instructions stored in a memory. The method comprises performing one or more analytical operations to extract data from one or more source databases in one or more data formats, the one or more source databases having one or more types of constraints and structures; performing one or more data refinement operations to categorize the data while the data is being extracted; performing one or more types of mapping operations of the categorized data based on one or more mapping rules; and performing an analytical transforming operation, based on one or more business rules, of the mapped categorized data to obtain a transformed categorized data, wherein the transformed categorized data is stored in a target area in the distributed data storage system.

In one embodiment, a non-transitory computer program product having embodied thereon computer program instructions for analytical processing of data in a distributed data storage system is disclosed. The instructions comprises instructions for authenticating and receiving one or more queries from one or more users; performing an analysis to extract data from one or more source databases in one or more data formats with respect to the one or more queries, the one or more source databases having one or more types of constraints and structures; categorizing the data in a repetitive manner; analytically transforming the categorized data based on requirements corresponding to one or more queries; mapping the data in one or more types to obtain a transformed categorized data with respect to the one or more queries; and obtaining results from the transformed categorized data with respect to the one or more queries.

BRIEF DESCRIPTION OF DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

One or more components of the subject matter are described as modules for the understanding of the embodiments. For example, a module may include self-contained component in a hardware circuit comprising of logical gate, semiconductor device, integrated circuits or any other discrete component. The module may also be a part of any software program executed by any hardware entity, such as a processor. The implementation of a module as a software program may include a set of instructions to be executed by the processor or any other hardware entity. Further, a module may be incorporated with the set of instructions or a program by means of an interface.

The present subject matter provides a system and method for performing an analytical processing of data in a distributed data storage system. In some embodiments, data may be extracted from a plurality of source databases/systems after one or more analytical operations on the data are performed. The system in the present disclosure may perform operations for data refinement to categorize the data. The data may be further processed by performing operations such as mapping, transformation, etc. All these operations may be performed in a single stage, i.e., while the data is being extracted. At the time of transformation a secondary analysis may be carried out to further categorize the data. The transformed categorized data may then be stored in a target area present inside the distributed data storage system.

Figure 1:
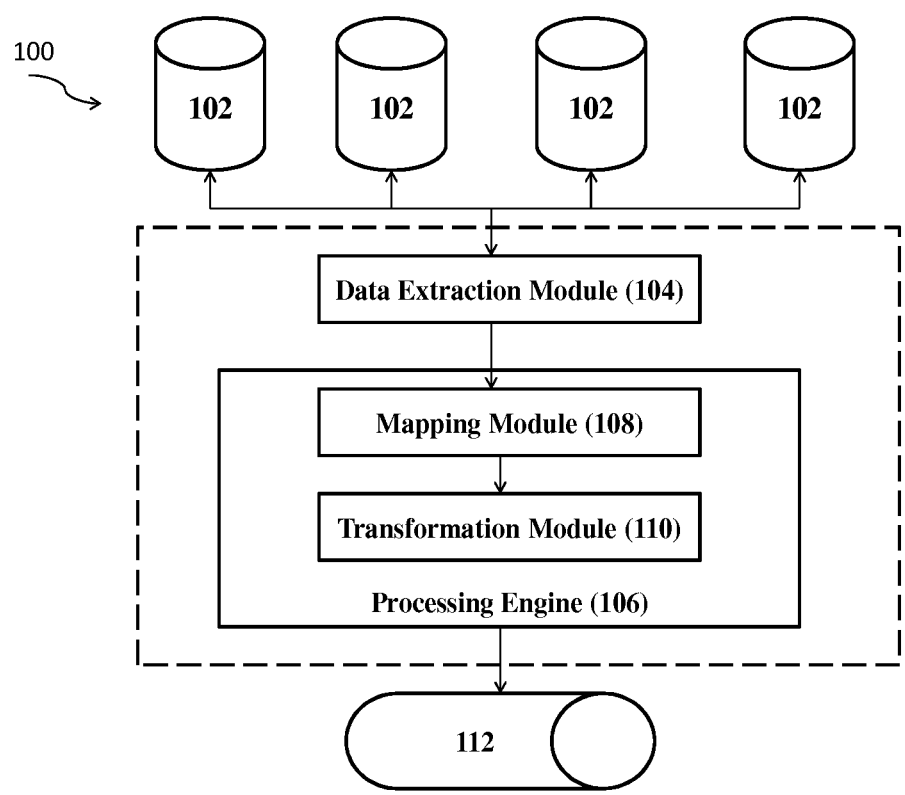
FIG. 1 illustrates an exemplary system for analytical processing of data in a distributed data storage system in accordance with an embodiment.

FIG. 1 illustrates an exemplary system 100 for analytical processing of data in a distributed data storage system. Referring to FIG. 1, in some embodiments, system 100 may comprise a data extraction module 104 configured to extract data from one or more source database/systems 102 in one or more format and a processing engine 106 configured to categorizing the data. The processing engine 106 may comprise a mapping module 108 and a transformation module 110. The transformed categorized data may be further stored in a target area in a distributed data storage system 112.

The data extraction module 104 may be configured to extract data from one or more source databases 102 in one or more format. The data extraction module 104 may perform first stage operations, such as elementary analytical operations, on the extracted data while the data is being extracted. The first stage operations are shown in FIG. 3B. The elementary analytical operations may form a part of the E@TL (Extract Analytical Transformation and Loading) process. The system disclosed in the present subject matter may thus provide the ability to ingest massive data in an as-is condition without having to sanitize the data. The distributed data storage 112 system may include, for example, Hadoop, which is a data storage system.

The data may be transactional data that may include POS (point-of-sale) transactions, call details records, general ledger records, call center transactions, and other similar data. The data may also include unstructured data such as consumer comments, descriptions, web logs, etc. The data may also include social media data obtained from social media websites such as LinkedIn, Facebook, Twitter, or similar websites. Regardless of the structure of the data, the data can be rapidly loaded into distributed data storage in as-is condition and can be available to downstream processes for analysis purposes. In system 100, the required data may not need to be loaded and can be operated after the data is copied into the distributed data storage within the distributed system, such as the Hadoop Distributed File System (HDFS).

Structured elements of a database, as input data, may also be represented in various formats such as in XML (extensible markup language), JSON, and/or CSV formats. For example, the input data can be a database of journal articles having attributes such as author, title, publication, date, etc. The input data, such as the database of journal article, can be included as a single data element.

In some embodiments, for the purpose of extraction, one or more transporters (not shown) are used. These transporters may be used to import the data from the source database (e.g., a relational database management system (RDBMS)) to a distributed data storage system. At the time of data extraction, the elementary analysis may be performed on this data. By using various algorithms such as a frequent pattern matching algorithm to come up with patterns, elementary analysis may be performed on the data that is being imported into the distributed data storage system 112. This elementary analysis may facilitate condition checking, e.g., whether to import entire table/entire dataset or only same records after some transformation.

The system 100 further comprises of a processing engine 106 configured to refine the data before storing it into the distributed data storage system. The refinement may be performed to filter the extracted data so that the data can be categorized.

In some embodiments, the input data obtained from the source system in various formats may then be parsed into a single format that is suitable for further analytical transformation processing. The data can be transformed during the extraction of the source dataset without staging, because system 100 can enable the extraction of the data and the transformation of the data to be performed in parallel in a single step. After the data is staged in a distributed or big data storage system, the data may further be processed for transformation.

Figure 2:
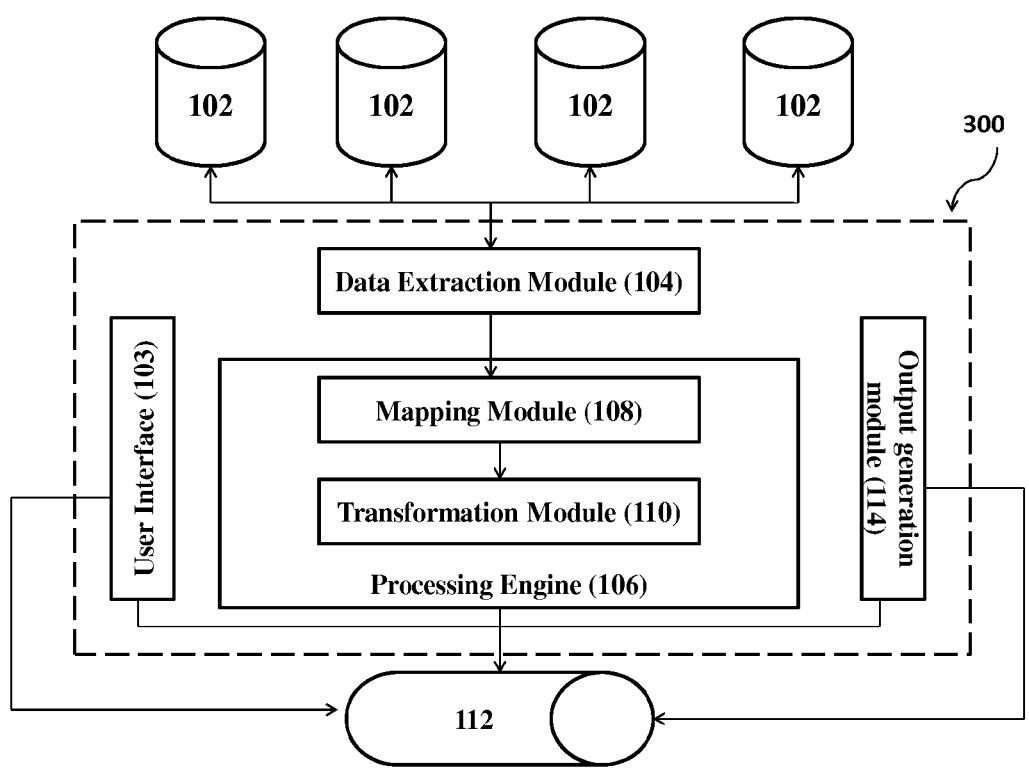
FIG. 2 illustrates one or more components associated with a computer program product for analytical data processing in accordance with another embodiment.
Figure 3A:
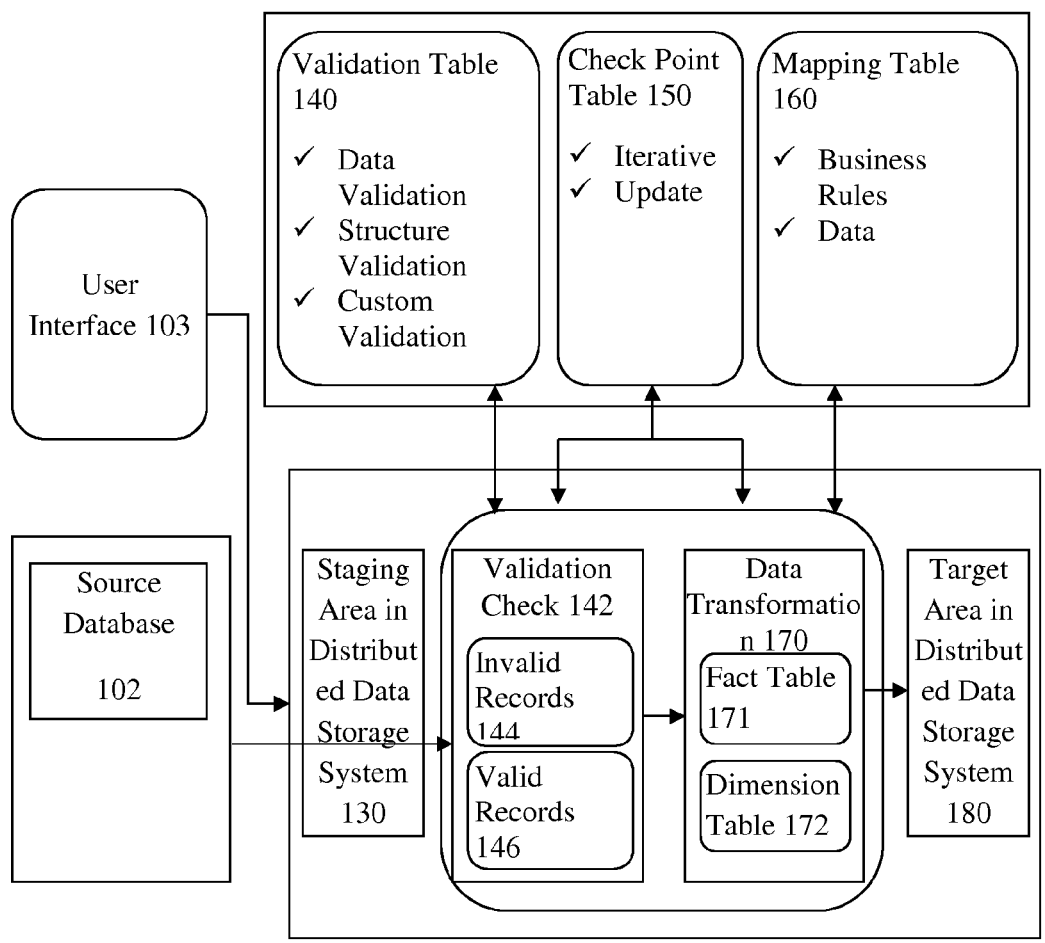
FIG. 3A illustrates an exemplary system for data validation and transformation in accordance with another embodiment.
Figure 3B:
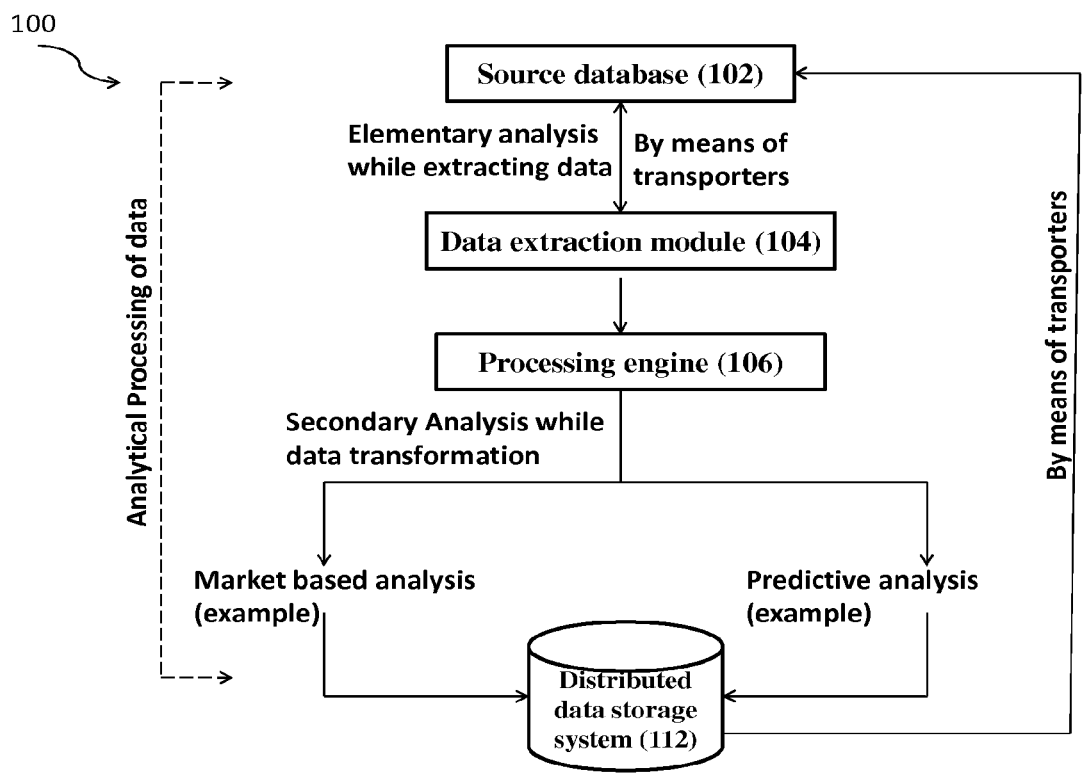
FIG. 3B illustrates an exemplary flowchart for analytical transformation/processing of data in accordance with another embodiment.

Referring now to FIGS. 2 and 3A, in case of flat files, the data may be parsed and stored in a distributed or big data storage system. Further, the one or more operations for data refinement, such as mapping and validation, may be applied to this parsed data. The parsed data that is extracted and transformed may then be stored into the staging area 130 of distributed data storage system. The parsed data stored in the staging area of distributed data storage system 130 may be subjected to validation, as shown in validation table 140, to control the type of data or values that may need to be validated. The validation table 140 may validate the parsed data. The validation may include, for example, data validation, structure validation, and custom validation with generic scripts, which can run in a distributed manner. After being validated, the parsed data stored in the staging area of distributed data storage system 112 may be sent for the validation check 142. Validation check 142 may segregate the parsed data into two different databases, depending on whether the data pass or fail the validation check 142. The validated data that passed through the validation steps of data, structure, and custom validation, may be stored in a database as valid records 146. The data that failed may be stored in a database as invalid records. The valid records stored in the valid database may then pass through a check point table 150 that includes iterations and updates. The check point table 150 can keep track of the state of each iteration variable for each pass-through of the iteration and can be updated accordingly.

The invalid records in the invalid database may be processed at least 3 times. After performing the iteration and updates in the check point table, the valid records stored in the valid database may then pass through a mapping table 160 to map the records based on the business requirement and concatenation by means of the mapping module. The mapping module 108 will perform one or more mapping operations over the categorized data (e.g., the valid data).

One or more sources can be mapped to one or more destinations in any manner that is desired. The mapping may include data mapping from one table to another table, from two or more data paths, and complex splitting of data into multiple output paths based on the input conditions. The data can be obtained from various sources, such as Oracle, DB2, that have different schemas and hence can be subjected to data transformation process, for each set of source data.

The system 100 may allow loading data from various sources with different schemas in a single step. The transformation process 170 may be applied to the data that has been staged and stored into multiple destinations. For example, in a single transformation process, data may be loaded into distributed data storage system 112 from one or more source database 102 (e.g., Oracle and DB2), that may have different schemas. Mapping table may be applied in a distributed file system through a single step for both source files, e.g., Oracle and SQL. The output may be stored in multiple files or tables in a distributed or big data storage area.

Referring to FIG. 3B, the processing engine 106 may further comprise of a transformation module 110 configured to perform a secondary analytical transformation based on pre-defined business rules over the mapped categorized data in order to obtain a transformed categorized data. Secondary analysis may form the second stage of the analysis performed by the E@TL (Extract Analytical Transformation and Loading) tool. Secondary analysis can then be performed on the transformed data based on the business use cases for analysis (e.g., market basket analysis). Predictive analysis may be performed on the raw data, once the data has been transformed in the required format as per the requirement of the analysis.

In some embodiments, retail datasets may be considered as source data. Secondary analysis, such as market basket analysis, can be performed using the E@TL (Extract Analysis Transformation and Loading) tool. Based on this analysis, the data can be transformed accordingly and stored in the target area. Sentiment analysis or fraud analysis combining transaction data with textual and other data can also be performed using the E@TL (Extract Analytical Transformation and Loading) tool.

After performing the transformation process, the valid records may be transformed and subjected to mapping, so that they can be reflected with fact and dimension tables. The status in checkpoint table may be updated again with the overwritten data with a mapped data of the existing information, obtained through the mapping table. The processed records may then be sent to the distributed data storage system target area 180 and the invalid records information may be sent back. The entire E@TL (Extract Analytical Transformation and Loading) process may be performed using the distributed environment and the data may be processed in the same database while processing.

In this manner, the mapped and analytically transformed (categorized) data may then be stored in a target area 180 in the distributed data storage system 112.

Further, the transporters may then be used for transporting this categorized transformed data (stored in the distributed data storage system) to RDBMS, where the data may be further used for one or more purposes. The purposes may include, but is not limited to, a market based analysis, a predictive data analysis, or a combination thereof.

Referring to FIGS. 2 and 3A, the present disclosure further provides a computer program product 300 for analytical processing of data in a distributed data storage system 112 with respect to one or more queries.

The computer program product 300 comprises of a user interface 103 configured to first authenticate one or more user and then receive one or more queries from said user. The user interface 103 may be further provided with an authentication module (not shown in figure) configured to perform authentication through a security feature, such as Kerberos (a networking authentication protocol), to prove identity to one another in a secure manner.

After the authentication process, a user can request for specific information from the distributed data storage system. After the user requests for information of data, the data extraction module (as described above) may collect data from various source databases 102. The data can be in a structured or unstructured form. Structured elements of a database may also be represented in various formats, such as XML (extensible markup language), JSON, CSV etc., as input data. For example, the input data can be a database of journal articles having attributes such as author, title, publication, and date. The input data, such as the database of journal article, can be included as a single data element.

Further, after elementary operations are performed, this extracted data may be processed for refinement. The processing engine 106 may be provided with the distributed data storage system 112 to perform this refinement, which may include performing mapping operations and analytical transformation operations of the extracted data. The refinement may produce categorized transformed data.

The mapping may include various types of mappings (as described above). The computer program product 300 may retrieve, via its output generation module 114, results from the transformed categorized data with respect to the user's query.

For the purpose of understanding and by way of specific example, the computer program product may refer to an E@TL (Extract Analytical Transform Loading) tool, which may be capable of processing the data in a unique manner, e.g., by utilizing the processing power of a distributed data storage system in a very easy and efficient manner.

In some embodiments, the methods and systems provided in the present disclosure can enable analyzing of affinity of items over a long duration (e.g., 6-10 years); can provide insights into running better promotions, planogram, and price planning using affinity of items. Moreover, the methods and systems provided in the present disclosure can enable reduction in basket and reduction in trips per month to competitor stores.

In some embodiments, the system provided in the present disclosure can extract data from any source system using the data extraction module and store it in distributed data storage system. The system can also transform the source data using the transformation module as per the business rules for finding affinity. The transformed data may be analyzed to identify the patterns and affinity among products by using frequent pattern matching algorithm. The competitor impact may be derived by linking segmentation and competitor data with frequency of store visits, basket size, and total spending of the consumers. The store target as selected may flatten structure for storing output. The output can then be used to gain insights, which may have business value.

In some embodiments, the methods and systems provided in the present disclosure can enable data processing with the capacity of distributed and parallel processing of big data by using or leveraging a map reduction framework. The systems provided in the present disclosure can be constraint-free or schema free; and can have source and destination independent mapping. Moreover, the systems provided in the present disclosure may allow multi-source to multi-destination mapping in a single step. Furthermore, the systems can also provide single-stage extract-transform capability.

Although implementations for methods and systems for providing analytical processing of data in a distributed data storage systems have been described in language specific to structural features and/or methods, it is to be understood that the appended claims are not necessarily limited to the specific features or methods described. Rather, the specific features and methods are disclosed as examples of implementations for providing analytical processing of data in a distributed data storage systems.

We claim:

1. A system for analytical processing of data in a distributed data storage system, the system comprising a processor and a memory storing instructions, the instructions comprising:
   a data extraction module configured to perform one or more elementary analytical operations while extracting data from one or more source databases in one or more data formats, the one or more source databases having one or more types of constraints and structures wherein the one or more elementary analytical operations facilitates condition checking; and
   a validation module configured to perform a repetitive data sorting operation in one or more stages wherein the repetitive data sorting operation identifies and categorizes the extracted data as a valid data and an invalid data, and stores the valid data and the invalid data in one or more corresponding databases;
   a processing engine configured to perform one or more data refinement operations while the data is being extracted wherein the processing engine performs one or more data refinement operations in parallel to the one or more elementary analytical operations performed by the data extraction module, the processing engine comprising:
      a mapping module configured to perform one or more types of mapping operations of the categorized data based on one or more mapping rules wherein the one or more types of mapping operations include data mapping from one table to another table, from two or more data paths and splitting of data into multiple output paths in a single step; and
      a transformation module configured to perform a secondary analytical transforming operation, based on one or more business rules, of the mapped categorized data to obtain a transformed categorized data, wherein the transformed categorized data is stored in a target area in the distributed data storage system.

2. The system as claimed in claim 1, wherein the transformed categorized data that is stored in the target area in the distributed data storage system enables at least one of a market based analysis and a predictive data analysis.

3. The system as claimed in claim 1, wherein the one or more elementary analytical operations comprise one or more algorithm-based analyses.

4. The system as claimed in claim 1, wherein the one or more source databases comprises at least one of an oracle database and a DB2.

5. The system as claimed in claim 1, wherein the system further comprises a parsing module configured to parse the extracted data into a custom format.

6. The system as claimed in claim 1, wherein the data includes at least one or a structured data, a semi-structured data, and an unstructured data.

7. The system as claimed in claim 6, wherein the data includes at least one of a JSON format, an XML format, and a CSV format.

8. The system as claimed in claim 1, wherein the condition checking involves keeping a check whether to import entire dataset or only some records after transformation.

9. A method for analytical processing of data in a distributed data storage system, the method being performed by a processor using programmed instructions stored in a memory, the method comprising:
   performing one or more elementary analytical operations while extracting data from one or more source databases in one or more data formats, the one or more source databases having one or more types of constraints and structures wherein the one or more elementary analytical operations facilitates condition checking;
   performing a repetitive data sorting operation in one or more stages wherein the repetitive data sorting operation identifies and categorizes the extracted data as a valid data and an invalid data, and stores the valid data and the invalid data in one or more corresponding databases;
   performing one or more data refinement operations while the data is being extracted wherein the one or more data refinement operations are performed in parallel to the one or more elementary analytical operations;
   performing one or more types of mapping operations of the categorized data based on one or more mapping rules wherein the one or more types of mapping operations include data mapping from one table to another table, from two or more data paths and splitting of data into multiple output paths in a single step; and
   performing a secondary analytical transforming operation, based on one or more business rules, of the mapped categorized data to obtain a transformed categorized data, wherein the transformed categorized data is stored in a target area in the distributed data storage system.

10. The method as claimed in claim 9, wherein the transformed categorized data that is stored in the target area in the distributed data storage system enables at least one of a market based analysis and a predictive data analysis.

11. The method as claimed in claim 9, wherein the one or more elementary analytical operations comprise one or more algorithm-based analyses.

12. The method as claimed in claim 9, wherein the one or more source databases comprise at least one of an oracle database and a DB2.

13. The method as claimed in claim 9, wherein the method further comprises parsing the extracted data into a custom format.

14. The method as claimed in claim 9, wherein the method further comprises performing a repetitive data sorting operation in one or more stages, wherein the repetitive data sorting operation identifies and categorizes the extracted data as a valid data and an invalid data, and stores the valid data and the invalid data in one or more corresponding databases.

15. The method as claimed in claim 9, wherein the data includes at least one of a structured data, an unstructured data, and a semi-structured data.

16. The method as claimed in claim 15, wherein the data include at least one of a JSON format, an XML format, and a CSV format.

17. The method as claimed in claim 9, wherein the condition checking involves keeping a check whether to import entire dataset or only some records after transformation.

18. A non-transitory computer program product having embodied thereon computer program instructions for analytical processing of data in a distributed data storage system, the instructions comprising instructions for:

authenticating and receiving one or more queries from one or more users;

performing one or more elementary analytical operations while extracting data from one or more source databases in one or more data formats with respect to the one or more queries, the one or more source databases having one or more types of constraints and structures wherein the one or more elementary analytical operations facilitates condition checking;

performing a repetitive data sorting operation in one or more stages wherein the repetitive data sorting operation identifies and categorizes the extracted data as a valid data and an invalid data, and stores the valid data and the invalid data in one or more corresponding databases;

performing one or more data refinement operations while the data is being extracted wherein the one or more data refinement operations are performed in parallel to the one or more elementary analytical operations;

performing one or more types of mapping operations of the categorized data based on one or more mapping rules wherein the one or more types of mapping operations include data mapping from one table to another table, from two or more data paths and splitting of data into multiple output paths in a single step; and performing a secondary analytical transforming operation, based on one or more business rules, of the mapped categorized data to obtain a transformed categorized data, wherein the transformed categorized data is stored in a target area in the distributed data storage system; and obtaining results from the transformed categorized data with respect to the one or more queries.

\* \* \* \* \*